United States Patent
Marchand et al.

(10) Patent No.: US 12,549,619 B2
(45) Date of Patent: Feb. 10, 2026

(54) METHOD FOR MANAGING THE PROCESSING OF A VIDEO STREAM IN A LOCAL AREA NETWORK

(71) Applicant: ORANGE, Issy-les-moulineaux (FR)

(72) Inventors: Hervé Marchand, Chatillon (FR); Mathieu Rivoalen, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/663,556

(22) Filed: May 14, 2024

(65) Prior Publication Data
US 2024/0388619 A1    Nov. 21, 2024

(30) Foreign Application Priority Data
May 15, 2023   (FR) ...................................... 2304804

(51) Int. Cl.
*H04L 65/80*    (2022.01)
*H04L 65/61*    (2022.01)

(52) U.S. Cl.
CPC .............. *H04L 65/80* (2013.01); *H04L 65/61* (2022.05)

(58) Field of Classification Search
CPC .... H04L 65/70; H04L 65/611; H04N 21/2343
See application file for complete search history.

(56) References Cited

U.S. PATENT DOCUMENTS

| | | | | |
|---|---|---|---|---|
| 8,681,758 B2 * | 3/2014 | Pothula | ................... | H04L 67/06 370/338 |
| 9,853,718 B2 * | 12/2017 | Chuberre | ................ | H04L 67/62 |
| 2006/0227864 A1 * | 10/2006 | Miyamoto | ............ | H04L 65/765 348/E5.002 |
| 2012/0320757 A1 * | 12/2012 | Lohmar | ................ | H04L 65/611 370/390 |
| 2013/0290418 A1 * | 10/2013 | Liu | ..................... | H04L 12/1854 709/219 |
| 2014/0173757 A1 * | 6/2014 | Kim | ........................ | H04L 67/52 709/217 |
| 2016/0044078 A1 * | 2/2016 | Hosur | ..................... | H04L 67/02 709/219 |
| 2016/0269801 A1 | 9/2016 | Harden et al. | | |
| 2023/0026376 A1 * | 1/2023 | Martin | ................ | H04N 21/436 |
| 2024/0154875 A1 * | 5/2024 | Kuboniwa | .......... | H04L 41/0806 |

FOREIGN PATENT DOCUMENTS

| EP | 3833038 A1 | 6/2021 | |
|---|---|---|---|
| WO | WO-2005036818 A1 * | 4/2005 | ......... H04L 12/1854 |

OTHER PUBLICATIONS

French Search Report and Written Opinion dated Oct. 12, 2023 for corresponding French Application No. 2304804, filed May 15, 2023.

* cited by examiner

*Primary Examiner* — Oanh Duong
(74) *Attorney, Agent, or Firm* — David D. Brush; Westman, Champlin & Koehler, P.A.

(57) ABSTRACT

A method for managing the processing of a data stream in a local area network including a set of data processing devices. The method includes selecting a device from the set of data processing devices and processing the stream in the selected device.

12 Claims, 2 Drawing Sheets

[Fig 1]
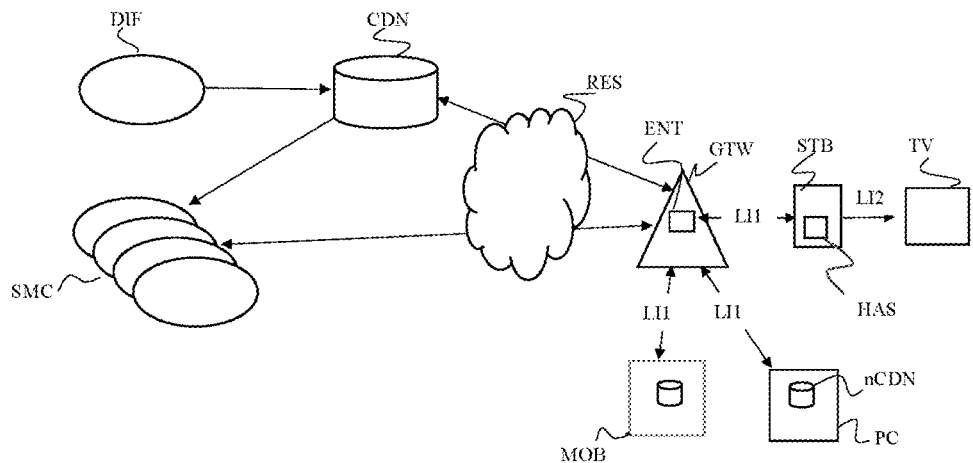
[Fig 2]
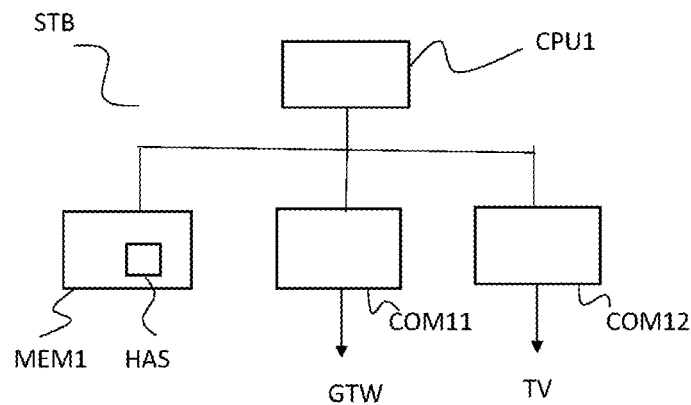
[Fig 3]
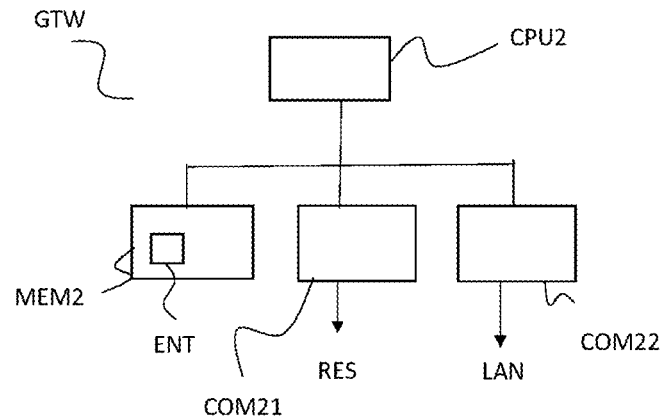

[Fig 4]
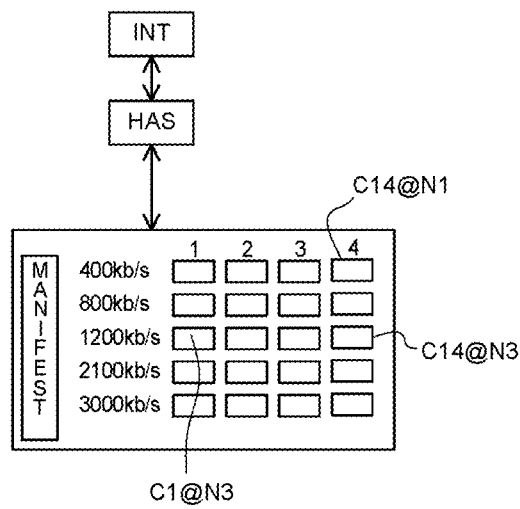
[Fig 5]
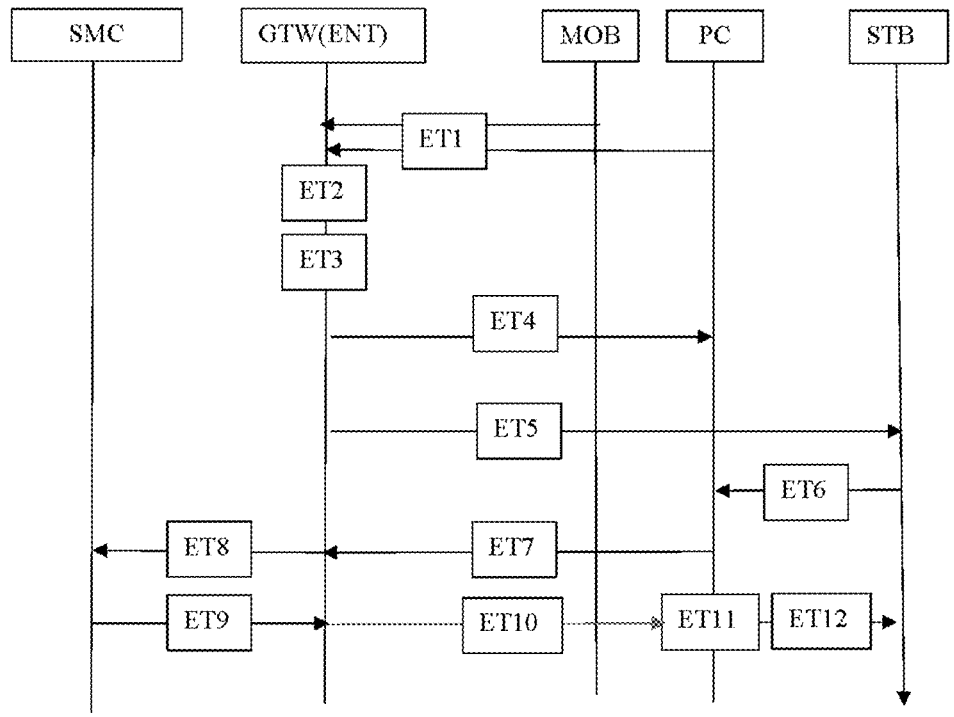

METHOD FOR MANAGING THE PROCESSING OF A VIDEO STREAM IN A LOCAL AREA NETWORK

TECHNICAL FIELD

The field of the disclosure is that of digital multimedia content items, specifically digital audio and/or video content items, also called audiovisual content items.

The disclosure relates to a method for managing the processing of a video stream in a local area network.

The processing entity is able to receive a data stream, process the data and transmit the processed data. In the example that will serve to illustrate an aspect of the disclosure below, the processing entity is a device equipped with a processor and is capable of receiving data packets from a first network, of processing the data to obtain content segments and of transmitting the obtained segments to a playback device on demand. Such an entity is for example an entity capable of providing segments in "adaptive streaming" mode, without being limited thereto.

A playback device targets in particular any device capable of receiving multimedia streams in the form of segments, for example a decoder, a mobile telephone, a tablet, etc., and of playing back the received content items.

The communication link between the playback device and a device providing the segments may be of any nature. In the example described below, this link will be a unicast link.

A content item is for example a content item broadcast in real time, also called "live" content by those skilled in the art, or a television on demand content item, or a video on demand content item, etc.

BACKGROUND

Nowadays, there are many modes for transmitting content from a content transmitter to a content playback device. One known mode is for example Multicast ABR (M-ABR or Multicast Adaptive Bit Rate) mode.

This M-ABR mode transports IP packets in multicast mode. In this mode, a plurality of multicast transmission channels are created for a single TV channel in order to encode and broadcast a plurality of streams with various qualities on each multicast channel, respectively. In other words, the channels broadcast one and the same content item with various image qualities, respectively.

An IP address is assigned to each channel, such that the content item is able to be accessed with a desired quality by connecting to the corresponding IP address.

The M-ABR multicast mode is implemented by a processing entity, which will be referenced nCDN below. This processing entity is installed in a home gateway that interfaces a wide area network (WAN) and a local area network (LAN). This processing entity acts as the endpoint for the multicast stream. In fact, this processing entity receives a stream of audio and/or video data transmitted from a server in multicast mode (for example with the "IPTV" (Internet Protocol television) technology); the processing entity then stores the received packets, segments the received packets in accordance with the HAS standard, and transmits the segments in succession to a segment playback device in unicast mode.

Since the processing entity is installed in the home gateway, the processing quality therefore depends on the processing capabilities of the gateway. It is important for the processing capabilities of the gateway to be optimum in order to best process the data stream and ensure optimum quality of service.

However, this is not always the case for multiple reasons. For example, at the time of processing, the gateway may process other data and may therefore have its processing capabilities reduced; also, the gateway may be natively inefficient in terms of processing capability for financial reasons. One problem is that, when the home gateway has its processing capability reduced or its performance is insufficient, frozen images are observed. The rendering of the content item is therefore not optimum, and user experience is very poor.

Therefore, when the home gateway is unavailable, access to the data stream is no longer possible.

SUMMARY

An aspect of the present disclosure relates to a method for managing the processing of a data stream in a local area network comprising a set of data processing devices, characterized in that it comprises a step of selecting a device from the set of data processing devices and of processing the stream in the selected device.

An exemplary aspect of the present disclosure avoids using a default device to process a data stream, in this case a home gateway. The possibility of choosing a device from a set of data processing devices as desired makes it possible, inter alia, to avoid a blocking situation linked to the unavailability of the device including the processing entity, for example because the device in question is turned off. Therefore, by processing the data stream using a device chosen judiciously in the local area network, for example the device that has optimum processing capabilities for the intended processing, the resulting processing will necessarily be of better quality. The risks of frozen images are then greatly reduced or even no longer exist.

One device of said set is a home gateway. According to a first embodiment, the stream is received by the home gateway in a first transmission mode, and routed by the gateway to the selected device so as to be processed there, the processing consisting in transforming the first transmission mode into a second transmission mode.

According to one variant of this first embodiment, the first mode is a multicast transmission mode and the second transmission mode is unicast mode.

According to a second embodiment, which may be implemented as an alternative or in addition to the previous embodiment, the data processing devices have an address in the network; in this configuration, the selection of the data processing device is followed by transmission of the address to a playback device able to play back the data stream resulting from the processing. This embodiment is useful when the home network is formed of multiple data processing devices. Upon receipt of this address, the playback device sends its requests for access to a content item using the address of the data processing device of the device to obtain segments from this selected device and then request rendering of the obtained segments. It will be seen in one example that this address is an IP (acronym for Internet Protocol) address. One variant could also consist, for the playback device, in sending all access requests to the home gateway, which then routes to the selected device.

According to a third embodiment, which may be implemented as an alternative or in addition to the previous embodiments, the data processing device is selected on the basis of its processing capabilities. As indicated above, a data processing device is chosen judiciously, here based on its capabilities, i.e. the capabilities of its hardware and/or software resources. This selection will make it possible to achieve better processing and therefore to ensure content rendering without frozen images.

According to a fourth embodiment, which may be implemented as an alternative or in addition to the previous embodiments, the selection is made by comparing the processing capabilities of devices of the local area network and by selecting a device based on the comparison. In this embodiment, a management entity retrieves the processing capabilities of all or some of the devices of the local area network, that is to say the processor powers, memory sizes, etc., respectively. Once they have been retrieved, the computation is limited to comparing the capabilities. This embodiment is simple and consumes very few resources.

According to a fifth embodiment, which may be implemented as an alternative or in addition to the previous embodiments, the processing capabilities include a volatile memory size. This embodiment makes it possible to select a device equipped with a volatile memory adapted to the data stream. For example, if the data stream is a 4K video stream entering the local area network, the volatile memory will be selected from among the volatile memories of the various devices so as to process this stream correctly. As a variant, with the data stream being associated with an encoding bit rate, the choice of the installation location of the processing entity may also depend on the encoding bit rate. Indeed, some streams have their encoding bit rates varied over time due to the variation in bandwidth on the network; in this case, it is advisable to take this encoding bit rate into account when choosing the volatile memory to be used, i.e. the device including this volatile memory.

According to a sixth embodiment, which may be implemented as an alternative or in addition to the previous embodiments, the local area network comprises a home gateway able to interface a wide area network and the local area network. In this configuration, the gateway routes a data stream from the network to the processing location in the local area network. This embodiment targets the case of receiving a data stream, for example a multimedia stream, from a content server, for example an M-ABR multicast server; the gateway, having knowledge of the selected device, in particular the IP address of the selected device, routes the received stream using this IP address.

According to a seventh embodiment, which may be implemented as an alternative or in addition to the previous embodiments, the data processing device is able to receive the data stream from a communication network. This embodiment makes it possible to select a data processing device that is capable not only of processing the stream efficiently but also of receiving the data stream from the communication network, for example without requiring a home gateway. The advantage is that, if the gateway is unavailable, the device thus selected is able to access the stream instead of the gateway.

According to an eighth embodiment, which may be implemented as an alternative or in addition to the previous embodiments, the chosen processing device varies over time. This embodiment makes it possible to modify the processing location of the data stream over time. This makes it possible to use the most suitable device, in particular when the chosen device has its capabilities reduced at a given time. The change of device used for processing may also be based on load predictions for the devices of the local area network.

According to one hardware aspect, the present disclosure relates to a management entity for managing the processing of a data stream in a local area network comprising a set of data processing devices, characterized in that it consists in selecting a data processing device from said set, and in processing the data stream in the selected device.

According to another hardware aspect, the present disclosure relates to a decoder comprising a management entity as defined above.

According to another hardware aspect, the present disclosure relates to a computer program able to be implemented on an entity as defined above, the program comprising code instructions that, when it is executed by a processor, carries out the steps of the selection method that are defined above.

Finally, according to another hardware aspect, the present disclosure relates to a data medium on which at least one series of program code instructions for executing a management method as defined above has been stored.

Such a recording medium may be any entity or device capable of storing the program. For example, the medium may comprise a storage means, such as a ROM, for example a CD-ROM or a microelectronic circuit ROM, or else a magnetic recording means, for example a USB key or a hard disk.

On the other hand, such a recording medium may be a transmissible medium such as an electrical or optical signal, which may be routed via an electrical or optical cable, by radio or by other means, such that the computer program that it contains is able to be executed remotely. The program according to an aspect of the present disclosure may in particular be downloaded from a network, for example the Internet.

As an alternative, the recording medium may be an integrated circuit in which the program is incorporated, the circuit being designed to execute or to be used in the execution of the abovementioned display control method.

BRIEF DESCRIPTION OF THE DRAWINGS

The present disclosure will be better understood on reading the following description, given by way of example and with reference to the appended drawings, in which:

FIG. 1 shows a computer system on which one exemplary embodiment of the disclosure is illustrated.

FIG. 2 is a simplified block diagram of the hardware structure of a playback device.

FIG. 3 is a simplified block diagram of the hardware structure of a home gateway.

FIG. 4 schematically illustrates a content item divided into segments of several qualities.

FIG. 5 illustrates one embodiment in the form of messages exchanged between the various devices involved in the management method.

DETAILED DESCRIPTION OF ILLUSTRATIVE EMBODIMENTS

A presentation is now given, with reference to FIG. 1, of a computer system SYS including a home gateway GTW offering a local area network containing data processing devices, namely a playback device STB, for example a decoder, a computer PC and a tablet TAB.

The system SYS also comprises a data stream processing entity, referenced nCDN.

In our example, the processing entity nCDN is able to transmit content segments to the playback device STB on demand.

FIG. 2 shows an architecture of a playback device STB. This device STB comprises, as is conventional, memories MEM1 associated with a processor CPU1. The memories may be ROMs (read-only memories) or RAMs (random access memories) or indeed flash memories.

The playback device STB may transmit a content item to be rendered to the rendering device TV via a communication module COM12. This module COM12 is for example an HDMI link.

The playback device STB communicates with the gateway via an Ethernet module for wired local communication or via a Wi-Fi radio module for wireless local communication with the home gateway GTW. The module in question is referenced CMO11 in FIG. 2.

The playback device STB comprises a streaming-mode download entity HAS able to manage the downloading of segments. This download entity HAS is able to communicate with a compatible data stream processing entity nCDN.

FIG. 3 shows an architecture of a home gateway GTW. This gateway comprises, as is conventional, memories MEM2 associated with a processor CPU2. The memories may also be ROMs (read-only memories) or RAMs (random access memories) or indeed flash memories.

The gateway communicates with a WAN wide area network via a communication module COM21.

The gateway is able, using a communication module COM22, to transmit a content item to a device of the local area network via a link LI1, a Wi-Fi link in our example.

The gateway GTW furthermore comprises a management entity ENT able to carry out steps described below. The management entity ENT is located in the gateway in the example; however, it could be located elsewhere in the system, for example on a data processing device of the local area network.

The segments created by the processing entity nCDN are compatible with the entity HAS.

In our example, the processing entity nCDN has a plurality of multicast sources SMC for retrieving a content item.

To select one of the multicast data sources SMC, the playback device STB, i.e. the module HAS present on the playback device STB, sends a request requesting access to the content item and indicates a desired rendering quality, often expressed in kbits/see by those skilled in the art. Following receipt, the entity nCDN addresses (or subscribes to) one multicast server SMC (among a plurality of multicast servers) possessing the content item in the desired quality and, in return, receives the content item from the multicast server in question via the telecommunications network, the Internet in our example; the transmission mode implemented between the multicast server and the processing entity is for example the IPTV (abbreviation for "Internet Protocol television") mode, known to those skilled in the art. An aspect of the present disclosure is not limited to IPTV mode, but to any other similar transmission modes.

Next, after having received the content item in a given quality, the processing entity nCDN stores the received IP packets in a RAM memory so as to process these packets, the processing consisting, in our example, in dividing the packets into segments, and in encoding each segment so as to obtain segments in the requested quality.

After encoding, the processing entity nCDN, in response, transmits a manifest including the addresses (URLs) of the segments thus created.

It will be seen below where the processing entity nCDN is located in the local area network according to an aspect of the present disclosure.

A brief explanation will also be given below about what a segment consists of and what the possible qualities (expressed in Kbits/s) for each segment of a content item are.

A communication network RES enables communication between content sources, in our example multicast servers each offering respective qualities for one and the same content item and the entity nCDN. In our example, the network RES is the Internet.

The playback device STB is connected to the gateway GTW via a communication link LI1 and to a rendering device TV, such as a television screen, via a communication link, for example an HDMI link.

In our example, the link between the playback device STB and the processing entity nCDN is a point-to-point (or unicast) link.

With reference to FIG. 4, various qualities may be encoded for the same content item of a channel, corresponding for example to various encoding bit rates.

This FIG. 4 shows segments in the form of a table, the entity HAS accessing the segments, and an interface that allows the entity HAS to communicate with the outside world.

The term "quality" will be used to refer to a certain resolution of the digital content item (spatial resolution, temporal resolution, quality level associated with the video and/or audio compression) with a certain encoding bit rate. Each quality level is itself divided into time segments on the content server.

The description of these various qualities and the associated temporal segmentation, as well as the content segments, are described for the playback device STB and made available thereto via their Internet addresses (URI: Universal Resource Identifier). All of these parameters (qualities, segment addresses, etc.) are generally grouped together in a parameter file, referred to as a manifest by those skilled in the art. It will be noted that this parameter file may be a computer file or a set of information describing the content item, which is accessible at a certain address.

The playback device STB, in an HTTP adaptive streaming context, may adapt the access requests that it transmits to the entity nCDN in order to be able to receive and decode the requested content item at the quality that best corresponds thereto. In our example, if the content items are available at bit rates of 400 kb/s (kilobits per second) (resolution 1, or level 1, denoted N1), 800 kb/s (N2), 1200 kb/s (N3), 2100 kb/s (N4) and 3000 kb/s (N5) and if the client terminal has available a bandwidth of 3000 kb/s, it may request the content item at any bit rate that is lower than this limit, for example 2100 kb/s. Generally speaking, content item number i with quality j is denoted "Ci@Nj" (for example, the jth quality level Nj described in the manifest).

In this example, to display a content item, the playback device STB first interrogates the processing entity nCDN via the service gateway GTW in order to obtain an address of the manifest of the content item managed by the device in question. Hereinafter, it will be assumed that this file is a manifest in accordance with the MPEG-DASH standard.

A manifest contains information about the available segments and encoding bit rates. Such a file contains for example, for each segment, multiple different qualities (N1=400 kb/s, N2=800 kb/s, N3=1200 kb/s, etc.) and the access addresses of the segments in question. Once the playback device STB possesses segment addresses corresponding to the desired content item, the playback device STB downloads the segments one after another. It will be noted that this download is carried out here, conventionally, via an HTTP URL, but might also be carried out via a Universal Resource Identifier (URI) describing another protocol (dvb://mycontentsegment, for example).

Next, the decoder STB receives the segments, then decodes them, and requests rendering on the screen of the television set TV.

It should be noted that the content item may be of any nature. The content item is for example a television program with deferred broadcasting, or a video on demand, or a personal video of the user, or any other multimedia content item, to which an aspect of the present disclosure also applies.

The playback device STB is able to be controlled by the user using a remote control. The remote control may be a hardware-based or software-based remote control.

According to an aspect of the present disclosure, a preliminary step is carried out in which a data processing device is selected in the local area network to carry out the desired processing. Unlike the prior art, in which the entity is stored in the home gateway by default, in an aspect of the present disclosure, the processing entity may be located on a device of choice of the local area network.

More particularly, the stream received by the home gateway in a first transmission mode, here multicast mode, is routed by the gateway to the selected device so as to be processed there, the processing consisting in transforming the first transmission mode (multicast) into a second transmission mode (unicast).

Our example is based on a transformation from multicast mode into a unicast mode; however, an aspect of the present disclosure is not limited to this example, but extends to any type of transmission mode. The gateway could receive a stream in unicast mode and transform this stream into a multicast transmission mode in the local area network.

The reception of a stream in multicast mode and the transformation of this mode into a unicast transmission will be focused on below.

It will be seen in our example that the data processing device is selected on the basis of the performance of the hardware and/or software resources for carrying out the data processing.

The steps of one embodiment are described below with reference to FIG. 5. This FIG. 5 shows axes corresponding 1) to the multicast server, 2) to the gateway GTW including the device nCDN, 3) to a set of data processing devices and 4) to the playback device STB including the download module HAS.

A time axis is used to represent the order in which the steps are carried out.

In this FIG. 5, arrowed links are illustrated between the axes in order to illustrate exchanges of messages between the various devices.

In a step ET1, the management entity ENT, which is present in the home gateway in our example, receives data representative of hardware and/or software resources of all or some of the data processing devices of the local area network LAN, namely in our example the mobile MOB and the computer PC.

In a step ET2, in our example, the management entity ENT focuses on one hardware resource in particular, namely the RAM volatile memory of the various devices, more particularly the size of these memories in bytes. An aspect of the present disclosure is not limited to this resource, but extends to other resources; for example, other resources may be taken into account, namely the processor power, the communication links available to the data processing devices, for example allowing the reception of a data stream from the network RES, etc.

In a step ET3, the entity ENT classifies the devices on the basis of the sizes of the respective RAM memories and selects, in our example, the device having the largest size in bytes.

It will be assumed that the selected device is the computer PC.

In a step ET4, the management entity ENT asks to download the processing entity nCDN to the selected device PC. As a variant, the selected device may be equipped with a disabled processing entity. In this step ET4, instead of transmitting the processing entity, the processing entity is simply activated.

In a step ET5, the management entity ENT having available the IP address in the local area network of the computer PC designates this IP address and transmits this IP address to the client HAS installed in the playback device STB.

In our example, the computer PC having a Wi-Fi connection is able to communicate directly with the playback device STB.

It should be noted that, if the selected device is not able to communicate directly with the playback device STB, the selected device communicates with the playback device STB via the home gateway GTW.

In our example, at this stage, the computer PC, i.e. the processing entity nCDN installed on the computer PC, is able to transmit segments to the playback device STB in unicast mode.

It will then be assumed that the playback device STB transmits a request for access to a content item in a step ET6. This request is transmitted to the computer PC equipped with the processing entity nCDN, the computer having been selected as the processing location, namely for the change from multicast mode to unicast mode.

The entity nCDN, installed on the computer PC, receives and then, in a step ET7, requests access to the content item from a multicast server SRV chosen, in our example, on the basis of a quality provided in the request from the playback device STB. In our example, the request passes through the home gateway. The gateway routes the request in a step ET8.

In a step ET9, the home gateway GTW receives, in return, a data stream that it routes to the computer PC in a step ET10 so that the processing entity nCDN installed on the computer PC is able to process the received data stream.

In a step ET11, the processing entity nCDN then receives IP data packets from the gateway GTW. After receipt, the processing entity nCDN carries out processing using its processor. The processing is known to those skilled in the art and will not be described further because it is of no interest to the present disclosure. It should simply be recalled that the received IP packets are divided into content segments; in a step ET12, the segments are then transmitted successively from the computer PC to the playback device STB.

At this stage, the playback device STB is able to receive the segments, decode them and request rendering on the rendering device TV.

The embodiment described above may be subject to variants.

According to one variant, the location of the processing entity nCDN may be determined after each request for access to a content item from the playback device STB. The location where the data stream is processed therefore varies over time.

According to another variant, the location may be chosen during the reception of the content segments. Indeed, the initial choice might no longer be suitable later on, for example the limited CPU on the chosen equipment is suddenly called upon for another task. In this case, another data processing device is selected to carry out the processing of the processing entity nCDN.

It has been seen above in our exemplary embodiment that the processing capabilities include a volatile memory size. In addition, according to one variant, the management entity ENT also takes into account the encoding bit rate associated with the received stream. Indeed, since the encoding bit rate varies over time when the download is adaptive, the RAM memory requirements during the processing of the data stream also vary. The number of data processing devices suitable for the processing may therefore increase depending on the current encoding bit rate.

It has been seen above that the home gateway GTW routes the data stream to the chosen processing device, in this example the computer PC. As a variant, the data processing device is chosen according to its ability to receive the data stream from a communication network. This mode makes it possible to access the content item even if the gateway is unavailable; in this case, the selected device accesses the stream and receives the stream from the network RES instead of the gateway.

According to another variant, as indicated above, processing entities nCDN are stored natively on the data processing devices of the local area network and are able to be activated on demand. This variant avoids a step of transmitting the processing entity nCDN.

Lastly, it should be recalled here that an aspect of the present disclosure comprises, for processing of a data stream received by the local area network, a step of selecting (ET3) a device from the set of devices included in the local area network, and of processing the stream in the selected device. It will be understood here that, when a data stream is received and intended to be processed by a particular device, for example the home gateway, according to an aspect of the present disclosure, the processing location may be modified and relocated to a different device of the local area network. In other words, a data stream intended to be processed by one device will be processed by another device of the local area network.

It has also been seen above with reference to one embodiment that processing may concern changing from a multicast transmission mode to a unicast transmission mode; this embodiment relates to a method for managing the processing of a data stream in a local area network comprising a set of data processing devices (GTW, PC, MOB) including a home gateway, the stream being received by the home gateway in a first transmission mode and able to be received by a device of the local area network in unicast mode; the method comprising a step of selecting (ET3) a device from the set of data processing devices, and a step of transforming from multicast transmission mode to unicast mode in the selected device.

It will therefore be understood that the initial processing location may be the home gateway GTW; the location may then be the computer PC; the location may then become the home gateway again, etc. The processing location changes over time. It is specified lastly here that the term "entity" may correspond either to a software component or to a hardware component or to a set of software and hardware components, a software component itself corresponding to one or more computer programs or subroutines or, more generally, to any element of a program that is able to implement a function or a set of functions as described for the modules in question. In the same way, a hardware component corresponds to any element of a hardware assembly able to implement a function or a set of functions for the module in question (integrated circuit, chip card, memory card, etc.).

Although the present disclosure has been described with reference to one or more examples, workers skilled in the art will recognize that changes may be made in form and detail without departing from the scope of the disclosure and/or the appended claims.

What is claimed is:

1. A management method comprising:
    managing a processing of a data stream in a local area network including a home gateway, said network comprising a set of data processing devices, wherein the managing comprises:
    receiving a stream by the home gateway according to a first transmission mode;
    after receiving the stream, selecting a device from the set of data processing devices;
    routing the stream to the selected device according to the first transmission mode; and
    processing the stream in the selected device, the processing comprising transforming the stream for transmission in a second transmission mode, which is different than the first transmission mode.

2. The management method according to claim 1, wherein the first transmission mode is a multicast transmission mode and the second transmission mode is unicast mode.

3. The management method according to claim 1, wherein the data processing devices in the set have an address in the network, and the selection of the device is followed by transmission of the address to a playback device able to play back the data stream resulting from the processing.

4. The management method according to claim 1, wherein the device is selected based on the selected device's processing capabilities.

5. The management method according to claim 4, wherein the processing capabilities include a volatile memory size.

6. The management method according to claim 1, wherein the selecting is made by comparing processing capabilities of devices of the set of devices the local area network and by selecting a device of the set based on the comparison.

7. The management method according to claim 1, wherein the data stream is associated with an encoding bit rate, and the selecting depends on said encoding bit rate.

8. The management method according to claim 1, wherein the home gateway is able to interface a wide area network and the local area network, and the gateway routes the stream from the network to the selected device in the local area network.

9. The management method according to claim 1, wherein the selected data processing device is able to receive the data stream from a communication network.

10. A system comprising:
    a home gateway having at least one processor configured to:
        receive a stream in a local area network according to a first transmission mode, the local area network including a set of data processing devices;
        after receiving the stream, select a device from the set of data processing devices; and
        route the stream to the selected device according to the first transmission mode; and
    the selected device, which comprises at least one processor configured to process the stream in the selected device, the processing comprising transforming the stream for transmission in a second transmission mode, which is different than the first transmission mode.

11. The system of claim 10, wherein the selected device is a playback device.

12. First and second non-transitory computer readable data mediums on which program code instructions have been stored which when executed by at least one processor of a home gateway and a selected device, configure the home gateway and the selected device to implement a method comprising:
   receiving a stream by the home gateway according to a first transmission mode;
   after receiving the stream, the home gateway selecting a device from a set of data processing devices in a local area network;
   the home gateway routing the stream to the selected device according to the first transmission mode; and
   the selected device processing the stream in the selected device, the processing comprising transforming the stream for transmission in a second transmission mode, which is different than the first transmission mode.

\* \* \* \* \*